(12) United States Patent
Ohnishi

(10) Patent No.: US 8,542,291 B2
(45) Date of Patent: Sep. 24, 2013

(54) IMAGING APPARATUS AND IMAGE PLAYING APPARATUS HAVING A CONTROL DEVICE THAT DETERMINES WHETHER AN IMAGE PLANE IS WITHIN A RANGE

(75) Inventor: Naoyuki Ohnishi, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/978,796

(22) Filed: Dec. 27, 2010

(65) Prior Publication Data

US 2011/0181748 A1 Jul. 28, 2011

(30) Foreign Application Priority Data

Dec. 25, 2009 (JP) .................................. 2009-293944

(51) Int. Cl.
*H04N 5/228* (2006.01)

(52) U.S. Cl.
USPC ........................................ 348/222.1; 348/343

(58) Field of Classification Search
USPC ........................................ 348/340, 222.1, 343
See application file for complete search history.

(56) References Cited

U.S. PATENT DOCUMENTS

| | | | | |
|---|---|---|---|---|
| 7,936,392 B2 * | 5/2011 | Ng et al. | | 348/349 |
| 7,949,252 B1 * | 5/2011 | Georgiev | | 396/334 |
| 8,248,515 B2 * | 8/2012 | Ng et al. | | 348/343 |
| 2005/0001924 A1 | 1/2005 | Honda | | |
| 2008/0193026 A1 * | 8/2008 | Horie et al. | | 382/238 |
| 2008/0277566 A1 * | 11/2008 | Utagawa | | 250/208.1 |
| 2009/0135291 A1 | 5/2009 | Sugimoto | | |
| 2009/0140131 A1 * | 6/2009 | Utagawa | | 250/226 |
| 2011/0019184 A1 * | 1/2011 | Iwane | | 356/123 |
| 2011/0205388 A1 * | 8/2011 | Iwane | | 348/222.1 |
| 2012/0019711 A1 * | 1/2012 | Ng et al. | | 348/350 |
| 2012/0019712 A1 * | 1/2012 | Ng et al. | | 348/350 |

FOREIGN PATENT DOCUMENTS

| | | |
|---|---|---|
| JP | A-1-300210 | 12/1989 |
| JP | A-2002-116373 | 4/2002 |
| JP | A-2003-270522 | 9/2003 |

(Continued)

OTHER PUBLICATIONS

Nov. 13, 2012 Japanese Office Action issued in Japanese Patent Application No. 2009-293944 (with translation).

*Primary Examiner* — Roberto Velez
*Assistant Examiner* — Cynthia Segura
(74) *Attorney, Agent, or Firm* — Oliff & Berridge, PLC

(57) ABSTRACT

An imaging apparatus includes: a light receiving device having a micro lens array in which a plurality of micro lenses are arrayed two-dimensionally, and a plurality of photoelectric conversion elements that are provided for the plurality of micro lenses, and that outputs a plurality of photoreception signals that are obtained by receiving optical flux from an optical system via the micro lenses; a detection device that, based on the photoreception signals, detects an amount of displacement between an image plane obtained from the optical system and an image plane obtained from the light receiving device; a focal point adjustment device that performs focal point adjustment on the optical system based on the displacement amount; and a control device that, when an image plane that corresponds to the displacement amount is contained within an image plane range within which it is possible to create an image that is based on the photoreception signal, creates an image of the image plane that corresponds to the displacement amount based on a photoreception signal which is selected in accordance with the displacement amount from among the plurality of photoreception signals, and then displays this image.

12 Claims, 12 Drawing Sheets

(56) References Cited

FOREIGN PATENT DOCUMENTS

| JP | A-2004-354581 | 12/2004 |
| JP | A-2008-287050 | 11/2008 |
| JP | A-2009-133903 | 6/2009 |
| WO | WO 2009044776 A1 * | 4/2009 |

* cited by examiner

IMAGING APPARATUS AND IMAGE PLAYING APPARATUS HAVING A CONTROL DEVICE THAT DETERMINES WHETHER AN IMAGE PLANE IS WITHIN A RANGE

CROSS-REFERENCE TO RELATED APPLICATION

Priority is claimed on Japanese Patent Application No. 2009-293944, filed Dec. 25, 2009, the contents of which are incorporated herein by reference.

BACKGROUND

1. Field of the Invention

The present invention relates to an imaging apparatus and to an image playing apparatus.

2. Description of Related Art

Conventionally, imaging apparatuses are known that are capable of photographing moving images. Technology has been disclosed (see, for example, Japanese Patent Application (Publication (JP-A) No. 2008-287050A) in which, in such imaging apparatuses, in order to consecutively photograph images of a subject which have matching focal points, a focusing lens is driven during the photographing of the moving images so that adjustment of the focal point is repeatedly performed.

However, in the conventional technology, in order to perform focal point adjustment, it is necessary to constantly drive the focusing lens during the moving image photography, and as a result of the focusing lens being constantly driven, power consumption increases and there is also an increase in the lens driving noise (i.e., in abnormal noise) so that the problem arises that this lens driving noise is audibly recorded as noise.

It is an object of aspects of the present invention to provide an imaging apparatus that properly obtains images whose focal points match a subject while reducing the frequency at which the focusing lens is driven.

SUMMARY

An imaging apparatus according to an aspect of the present invention includes: a light receiving device having a micro lens array in which a plurality of micro lenses are arrayed two-dimensionally, and a plurality of photoelectric conversion elements that are provided for the plurality of micro lenses, and that outputs a plurality of photoreception signals that are obtained by receiving optical flux from an optical system via the micro lenses; a detection device that, based on the photoreception signals, detects an amount of displacement between an image plane obtained from the optical system and an image plane obtained from the light receiving device; a focal point adjustment device that performs focal point adjustment on the optical system based on the displacement amount; and a control device that, when an image plane that corresponds to the displacement amount is contained within an image plane range within which it is possible to create an image that is based on the photoreception signal, creates an image of the image plane that corresponds to the displacement amount based on a photoreception signal which is selected in accordance with the displacement amount from among the plurality of photoreception signals, and then displays this image.

An image playing apparatus according to an aspect of the present invention includes: an input device that inputs a plurality of photoreception signals that are obtained by receiving optical flux from an optical system which is in a specific focal point state; a detection device that, based on the photoreception signals, detects an image plane position from the optical system which is in a specific focal point state; and a control device that, when the image plane position is contained within an image plane range within which it is possible to create an image that is based on the photoreception signal, creates an image of the image plane position based on a photoreception signal which is selected in accordance with the image plane position from among the plurality of photoreception signals, and then displays this image.

According to aspects of the present invention, it is possible to properly obtain images whose focal points match a subject while reducing the frequency at which the focusing lens is driven.

DESCRIPTION

Figure 1:
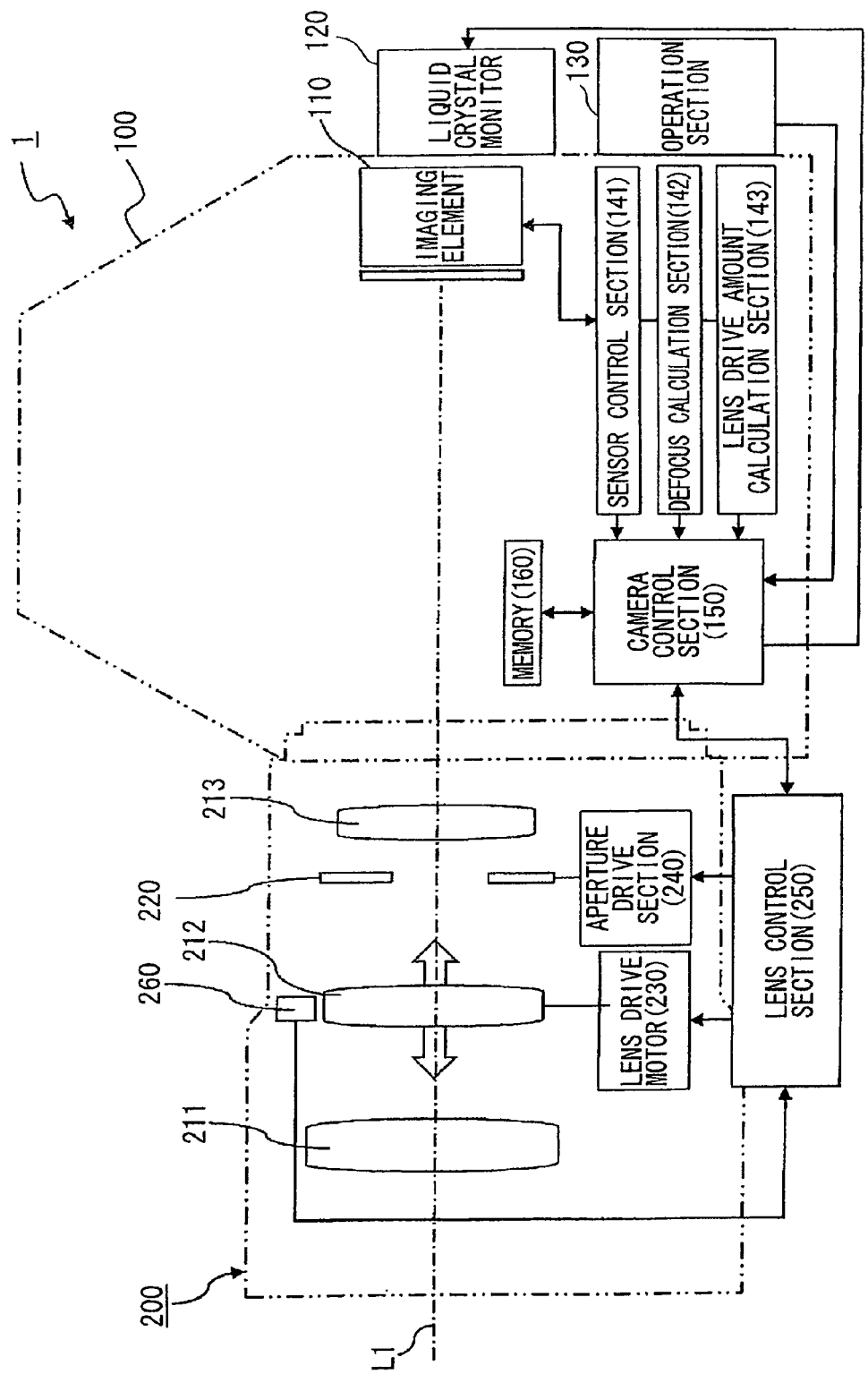
FIG. 1 is a block diagram showing the structure of a camera according to an embodiment.

Hereinafter, embodiments of the present invention will be described based on the drawings. FIG. 1 is a block diagram showing a camera 1 according to the present embodiment. Any depiction and description of typical camera structure other than the structure relating to the imaging apparatus of the present invention is partially omitted.

As is shown in FIG. 1, the camera 1 of the present embodiment is provided with a camera body 100 and a lens barrel 200, and is able to photograph both stationary images and moving images.

A photographic optical system (i.e., an optical system) which includes lenses 211, 212, and 213 as well as an aperture (a diaphragm) 220 is built into the lens barrel 200. The lens 212 of the present embodiment is a focusing lens.

The focusing lens 212 is provided such that it is able to move along an optical axis L1 of the lens barrel 200, and the position thereof is adjusted by a lens drive motor 230 while the position thereof is being detected by an encoder 260.

The specific structure of the mechanism used to move the focusing lens 212 along the optical axis L1 is not particularly limited. As an example, a rotating cylinder is rotatably inserted in a fixed cylinder which is fixed to the lens barrel 200. Helicoid grooves (i.e., spiral grooves) are formed on the inner circumferential surface of this rotating cylinder, and an end portion of a lens frame which fixes this focusing lens 212 is fitted into this helicoid groove. When the rotating cylinder is rotated by the lens drive motor 230, the focusing lens 212 which is fixed to the lens barrel is moved in a straight line along the optical axis L1. Note that the lenses 211 and 213 are also provided in the lens barrel 200 in addition to the focusing lens 212, however, here, the present embodiment is described using the focusing lens 212 as an example.

As is described above, by causing the rotating cylinder to rotate relative to the lens barrel 200, the focusing lens 212 which is fixed to the lens frame moves in a straight line in the direction of the optical axis L1, and the lens drive motor 230 which serves as the drive source for this is provided on the lens barrel 200. The lens drive motor 230 and the rotating cylinder are connected together by, for example, a transmission which is made up of a plurality of gears. When the drive shaft of the lens drive motor 230 is driven to rotate in a particular direction, rotation force is transmitted to the rotating cylinder at a predetermined gear ratio, and the rotating cylinder rotates in a particular direction. As a result of this, the focusing lens 212 which is fixed to the lens frame is moved in a straight line in a particular direction of the optical axis L1. Note that if the drive shaft of the lens drive motor 230 is driven to rotate in the opposite direction, the plurality of gears which make up the transmission also rotate in the opposite direction, and the focusing lens 212 moves in a straight line in the opposite direction of the optical axis L1.

The position of the focusing lens 212 is detected by the encoder 260. As has been described above, because the position of the focusing lens 212 in the direction of the optical axis L1 correlates to the rotation angle of the rotating cylinder, if, for example, the relative rotation angle of the rotating cylinder is detected relative to the lens barrel 200, then the position of the focusing lens 212 in the direction of the optical axis L1 can be determined.

As the encoder 260 of the present embodiment it is possible to use a device that employs an optical sensor such as a photo interrupter or the like to detect the rotation of a rotating circular plate which is linked to the rotation drive of the rotating cylinder, and then outputs pulse signals which correspond to the rotation speed, or to use a device in which a brush contact point which is provided on either the fixed cylinder or the rotating cylinder is brought into contact with an encoder pattern on the surface of a flexible printed wiring plate which is provided on the other of the fixed cylinder and the rotating cylinder, and a detection circuit is then used to detect changes in the contact position which correspond to the amount of movement of the rotating cylinder (it can be either in the rotation direction or in the direction of the optical axis).

The focusing lens 212 can be moved by the aforementioned rotation of the rotating cylinder in the direction of the optical axis L1 between an end portion on a camera body 100 side (also referred to as a close-up end) and an end portion on a subject side (also referred to as an infinity end). In addition, current position information for the focusing lens 212 which is detected by the encoder 260 is transmitted to a camera control section (control device, focal point adjustment device, recognition device) 150 (described below) via a lens control section 250. The drive amount for the focusing lens 212 which is calculated based on the position information for the focusing lens 212 is transmitted from the camera control section 150 via the lens control section 250, and based on this, the lens drive motor 230 is driven.

The aperture 220 limits the amount of luminous flux (optical flux) which passes through the photographic optical system and arrives at an imaging element (light receiving device) 110 which is provided in the camera body 100, and is constructed so that the diameter of the aperture which is centered on the optical axis L1 is able to be adjusted in order to adjust the amount of defocus. The adjustment of the aperture radius is performed, for example, by transmitting a suitable aperture diameter which has been calculated in automatic exposure mode from the camera control section 150 to an aperture drive section 240 via the lens control section 250, and by the aperture drive section 240 then driving the aperture 220. An aperture diameter set by manual operation via a operation section 130 provided in the camera body 100 is input into the lens control section 250 from the camera control section 150. The aperture diameter of the aperture 220 is detected by a diaphragm aperture diameter sensor (not shown), and the current aperture diameter is recognized by the lens control section 250.

Figure 2:
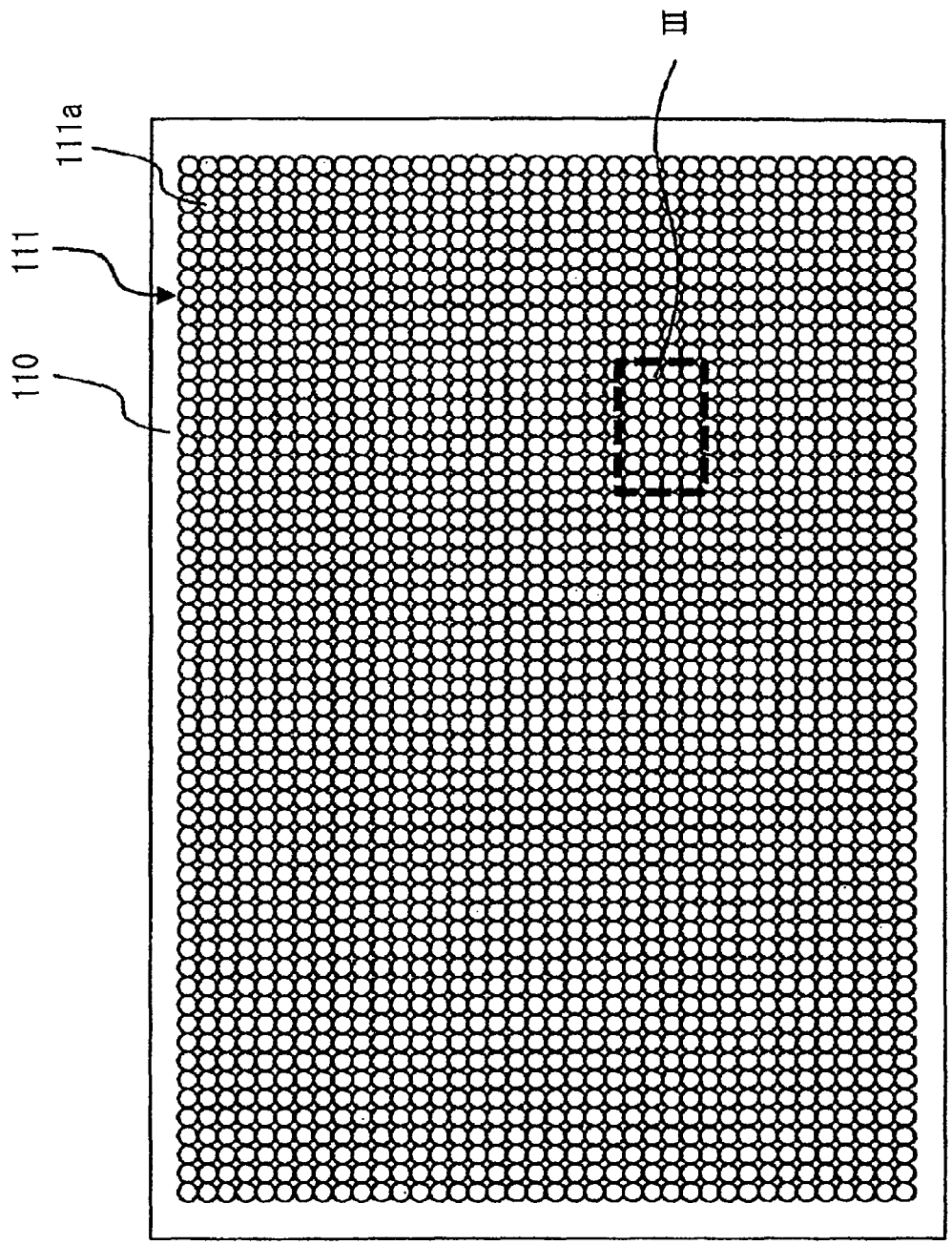
FIG. 2 is a plan view showing an example of a pixel array which forms part of the imaging element shown in FIG. 1.
Figure 3:
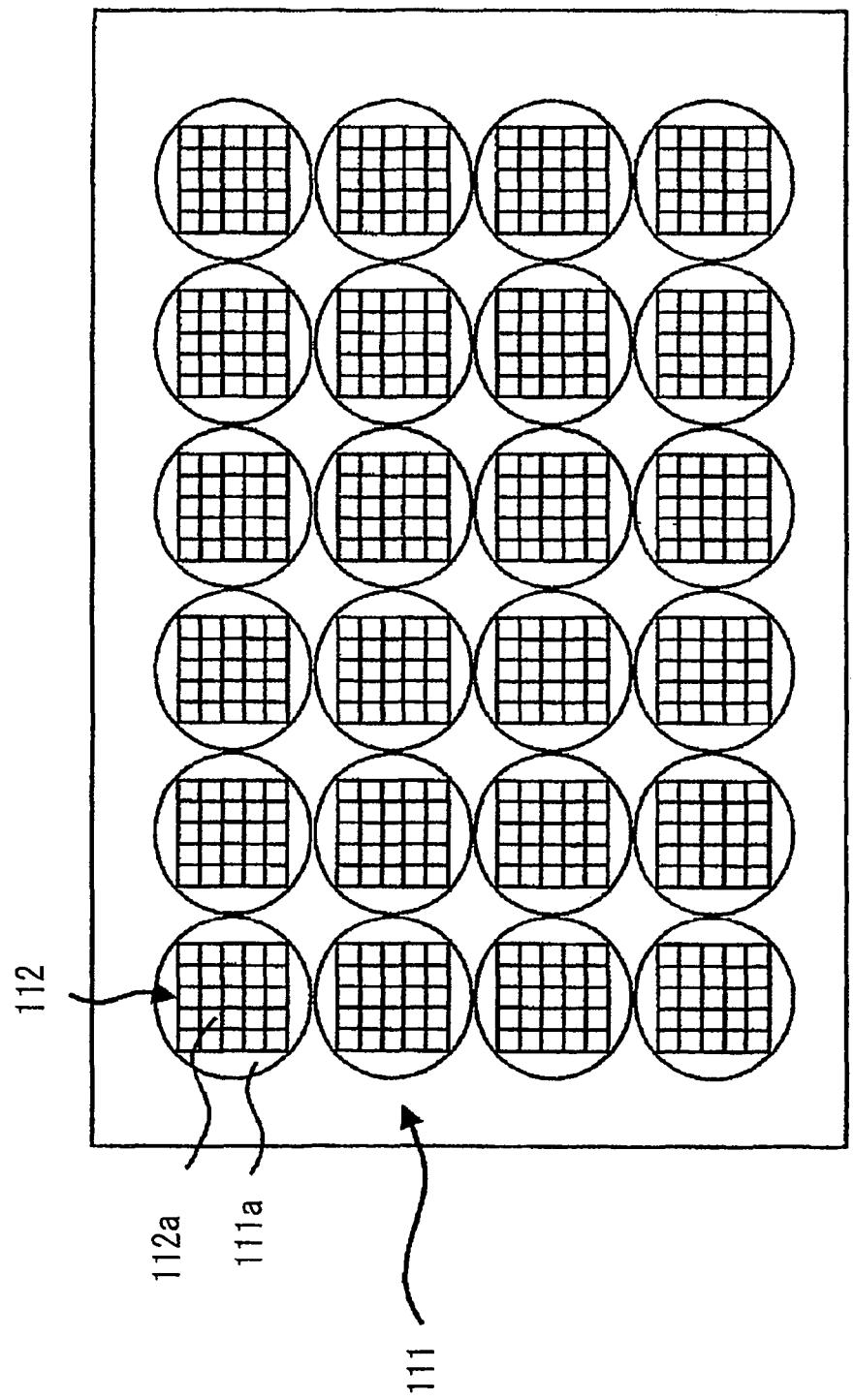
FIG. 3 is an enlargement of a portion III shown in FIG. 2.

In contrast, the imaging element 110 that receives luminous flux from a subject is provided in the camera body 100 at a position on the optical axis L1 which is also on the provisional focal plane of the photographic optical system. The imaging element 110 is formed from a device such as a two-dimensional CCD image sensor, a MOS sensor, or a CID sensor, and converts received light signals into photoreception signals. Here, FIG. 2 is a plan view showing an example of a pixel array forming part of the imaging element 110, while FIG. 3 is an enlargement of the portion III shown in FIG. 2. As is shown in FIG. 2, the imaging element 110 is provided with a micro lens array 111 in which a plurality of micro lenses 111a are densely arrayed two-dimensionally. The micro lens array 111 is set at a position on the provisional focal plane of the photographic optical system or adjacent thereto. Moreover, as is shown in FIG. 3, in each micro lens 111a the imaging element 110 has a respective photoelectric conversion element array 112 which is formed by a plurality of photoelectric conversion elements 112a. Note that, in FIG. 3, the number (i.e., the pixel density) of the photoelectric conversion elements 112a that make up the photoelectric conversion element array 112 is five in a vertical direction and five in a horizontal direction, however, the number of photoelectric conversion elements 112a is not particularly limited to this.

Figure 4:
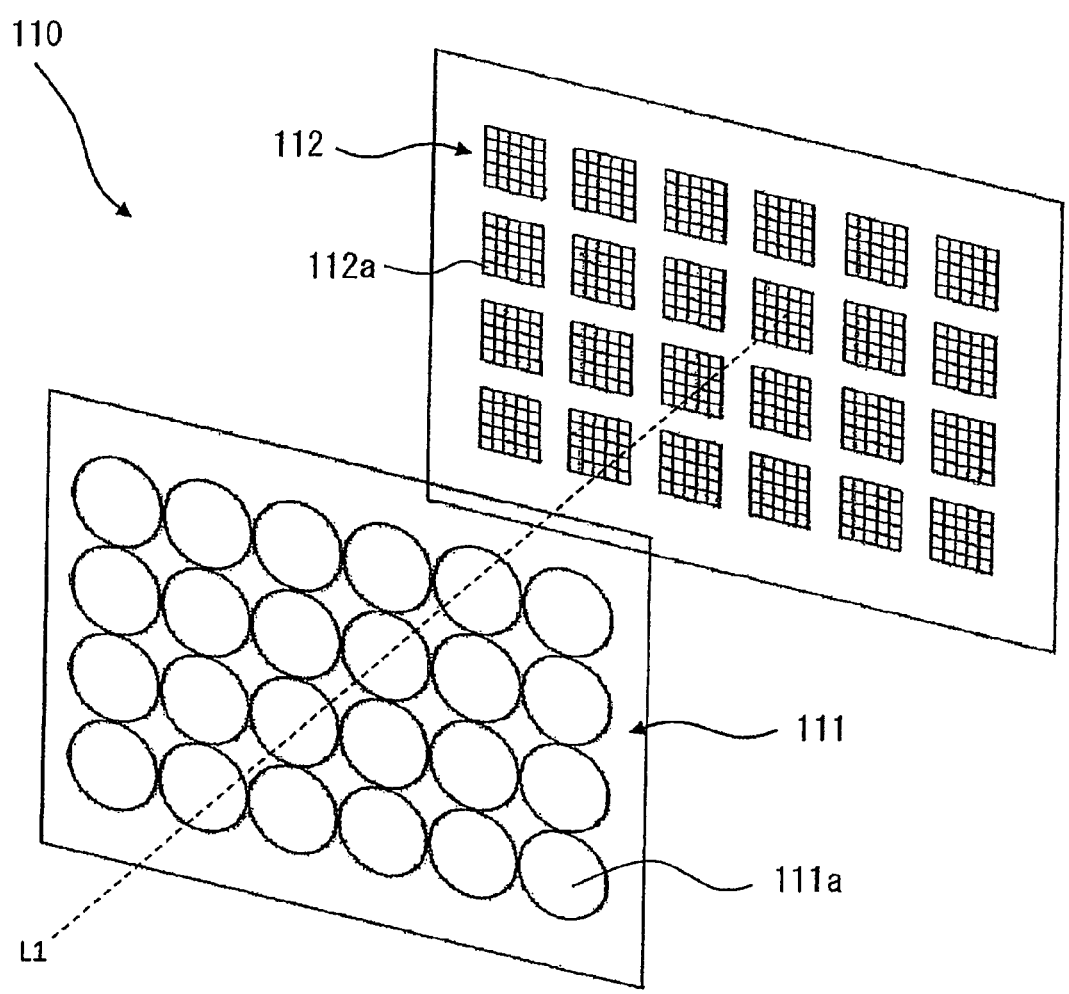
FIG. 4 is a view used to illustrate the structure of an imaging element.

Furthermore, FIG. 4 is a view illustrating the structure of the imaging element 110 and, in the same way as in FIG. 3, is a perspective view showing an enlargement of the portion III in FIG. 2. As is shown in FIG. 4, the photoelectric conversion element array 112 is located behind the micro lens array 111, and a space which corresponds to the focal point distance of the micro lenses 111a is provided between the micro lens array 111 and the photoelectric conversion element array 112. Luminous flux (i.e., the optical axis L1) from a subject is firstly irradiated onto the micro lenses 111a. It passes through the micro lenses 111a and is received by the photoelectric conversion elements 112a. Photoreception signals which are based on the luminous flux received by the respective photoelectric conversion elements 112a are then transmitted to a sensor control section 141. Note that the photoreception signals which are transmitted from the imaging element 110 to the sensor control section 141 are then transmitted from the sensor control section 141 to the camera control section 150 where they are converted into image data and stored in memory (i.e., in a storage section) 160, and are also used in defocus calculations performed by a defocus calculation section (i.e., the detection device) 142.

The sensor control section 141 controls the reception of the photoreception signals by the respective photoelectric conversion elements 112a that form part of the photoelectric conversion element array 112, and controls the gain and storage time such that the photoreception signals received by the respective photoelectric conversion elements 112a are suitable signals. Moreover, the sensor control section 141 receives photoreception signals from the imaging element 110 and transmits the received photoreception signals to the camera control section 150 and the defocus calculation section 142.

The defocus calculation section 142 receives photoreception signals from the sensor control section 141 and reads a portion of the received photoreception signals as signals to be used for focal point detection. In the present embodiment, because focal point detection is performed for the primary subject in a photograph image (described below) from among all of the regions in an image being photographed, the defocus calculation section 142 reads, as the signals to be used for focal point detection, the photoreception signals output from the respective photoelectric conversion elements 112a which correspond to the micro lenses 111a of not all of the areas in a photograph image, but of the areas in the photograph image which corresponds to the primary subject (referred to hereinafter as subject areas).

Here, as is described above, the micro lens array 111 (i.e., the respective micro lenses 111a) is placed at a position on the provisional focal plane of the photographic optical system or adjacent thereto. A pupil image of the photographic optical system is then focused by each micro lens 111a on the photoelectric conversion element array 112 (i.e., each photoelectric conversion element 112a) which is located on the rearward side of this micro lens array 111 (i.e., of each micro lens 111a). Because each of the photoelectric conversion elements 112a that make up the photoelectric conversion element array 112 corresponds to the respective portions of a pupil, if the photoelectric conversion elements 112a are selected for each micro lens 111a and the outputs thereof are synthesized, then an image photographed using an aperture which corresponds to the photoelectric conversion elements 112a can be obtained. Accordingly, in the present embodiment, the outputs of the photoelectric conversion elements 112a that correspond to the respective portions of a pupil are synthesized by the defocus calculation section 142 and, using the image thus obtained, the amount of image displacement is calculated using a pupil sectional phase difference detection method for the subject areas that correspond to the primary subject. As a result, the image displacement amount in the subject areas can be determined as a defocus amount df. In addition, the defocus calculation section 142 transmits the determined defocus amount df to the camera control section 150 and a lens drive amount calculation section 143.

The lens drive amount calculation section 143 calculates a drive amount ΔW for the focusing lens 212 based on the defocus amount df transmitted from the defocus calculation section 142, and outputs it to the camera control section 150.

A liquid crystal monitor (display unit) 120 is provided at a rear surface of the camera body 100, and images which are based on the photoreception signals obtained by the imaging element 110 are displayed on a display (screen) provided in the liquid crystal monitor 120.

The operation section 130 is provided with a shutter release button, and an input switch that is used by a photographer to set the various types of operating mode of the camera 1. The operation section 130 is used to switch between still image photography mode and moving image photography mode, and between autofocus mode and manual focus mode. If moving image photography mode is selected, then when the shutter release button is pressed by a photographer, an operation to start or an operation to end the moving image photography is performed.

The camera control section 150 is formed by peripheral components such as a microprocessor and memory and the like, and acquires photoreception signals transmitted from the imaging element 110. Based on these acquired photoreception signals, the camera control section 150 creates through-the-lens images and synthesizes photographed images using an image synthesizing method (described below). Furthermore, the camera control section 150 detects an image plane position which is focused on a subject and, based on the detection results, controls the driving of the focusing lens 212 via the lens control section 250. Note that synthesized captured images are transmitted from the camera control section 150 to the liquid crystal monitor 120 and, in addition to being displayed on the liquid crystal monitor 120, they are also transmitted to the memory 160 where they are stored.

The camera control section 150 also recognizes photograph scenes based on photoreception signals obtained by the imaging element 110 and, based on a recognized scene, recognizes a primary subject in a photograph image. When the camera control section 150 has recognized the primary subject in a photograph image, it sets the areas in the photograph image that correspond to the primary subject as the subject areas.

Figure 5:
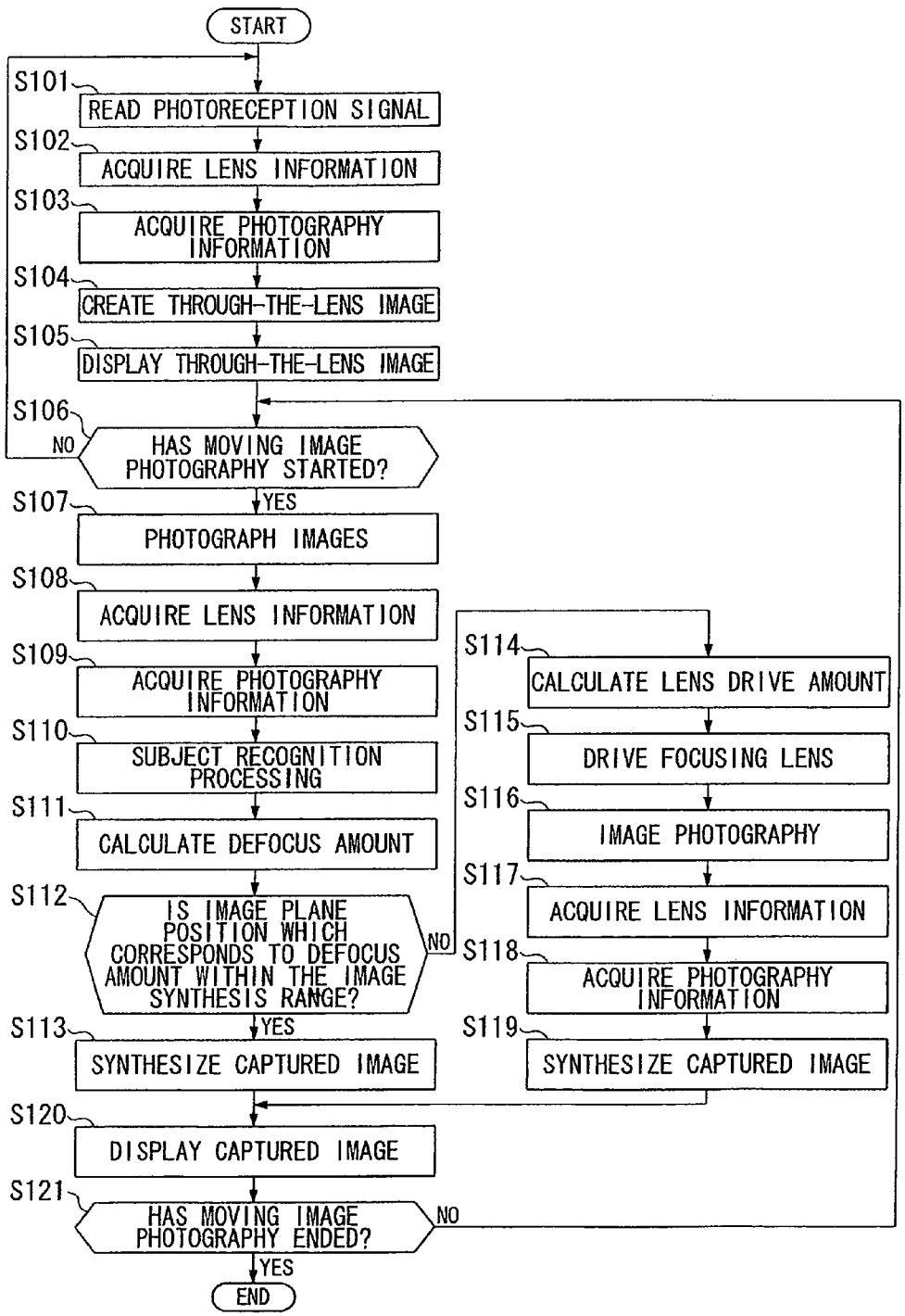
FIG. 5 is a flow chart showing an operation of a camera.

Next, an example of an operation of the camera 1 according to the present embodiment will be described. In the following description, processing which is performed when the moving image photography mode has been selected by the photographer via the operation section 130 is described based on the flowchart shown in FIG. 5. FIG. 5 is a flowchart showing an operation of the camera 1 according to the present embodiment.

Firstly, in step S101, based on a signal input from the sensor control section 141, luminous flux is received from the photographic optical system by the imaging element 110, and photography for displaying a through-the-lens image is performed. Next, signals which correspond to the respective photoelectric conversion elements 112a are transmitted from the imaging element 110 to the sensor control section 141, and the signals transmitted to the sensor control section 141 are read by the camera control section 150.

In step S102, lens information is acquired from the lens control section 250 by the camera control section 150. This lens information includes information such as the lens position of the focusing lens 212, the focal point distance, and the F-value of the aperture. In the next step S103, photography information is acquired by the camera control section 150. This photography information is information such as the photography conditions for taking a photograph and includes information such as, for example, the aperture value, ISO sensitivity, gain, and white balance. The camera control section 150 acquires information such as, for example, the ISO sensitivity, the gain, and the white balance from the sensor control section 141, and also acquires the aperture value from the memory provided in the camera control section 150. This lens information and photography information is used in the reading of the photoreception signal by the camera control section 150 (step S101), and in the creation of the through-the-lens image by the camera control section 150 (step S104).

In step S104, based on the photoreception signal acquired in step S101, a through-the-lens image is created by the camera control section 150. Note that when creating the through-the-lens image in step S104, the camera control section 150 is able to use the lens information and photography information acquired in steps S102 and S103. For example, if the aperture value is set to the maximum (i.e., the minimum opening size), then in step S103 the camera control section 150 acquires the aperture value which is set to the maximum (i.e., to the minimum opening size) and, in step S104, based on this aperture value, creates a pan-focus image having a deep focal point depth as the through-the-lens image.

In the next step S105, the created through-the-lens image is transmitted to the liquid crystal monitor 120 and is displayed on the display unit provided in the liquid crystal monitor 120. Note that in step S105, in addition to displaying a through-the-lens image, it is also possible for the through-the-lens image created in step S104 to be stored in the memory 160.

In step S106, a determination is made by the camera control section 150 as to whether or not to start moving image photography. For example, in moving image photography mode, when the shutter release button of the operation section 130 is pressed by the photographer, the camera control section 150 determines that moving image photography is to be started and the routine moves to step S107. If, however, the shutter release button of the operation section 130 is not pressed by the photographer, the camera control section 150 determines that moving image photography is not to be started and the routine returns to step S101. A photoreception signal is then acquired once again at the current lens position of the focusing lens 212 (step S101), and based on the acquired photoreception signal, the creation and display of a through-the-lens image is repeated (steps S104 and S105).

In step S107, at the current lens position of the focusing lens 212, based on the control of the sensor control section 141, photography of an image is performed by the imaging element 110. The photoreception signal obtained at the current lens position of the focusing lens 212 is then transmitted to the camera control section 150 and the sensor control section 141. In the next step S108, in the same way as in step S102, lens information such as the current lens position of the focusing lens 212 is acquired and, furthermore, in step S109, in the same way as in step S103, photography information such as the aperture value and the like is acquired.

Figure 6:
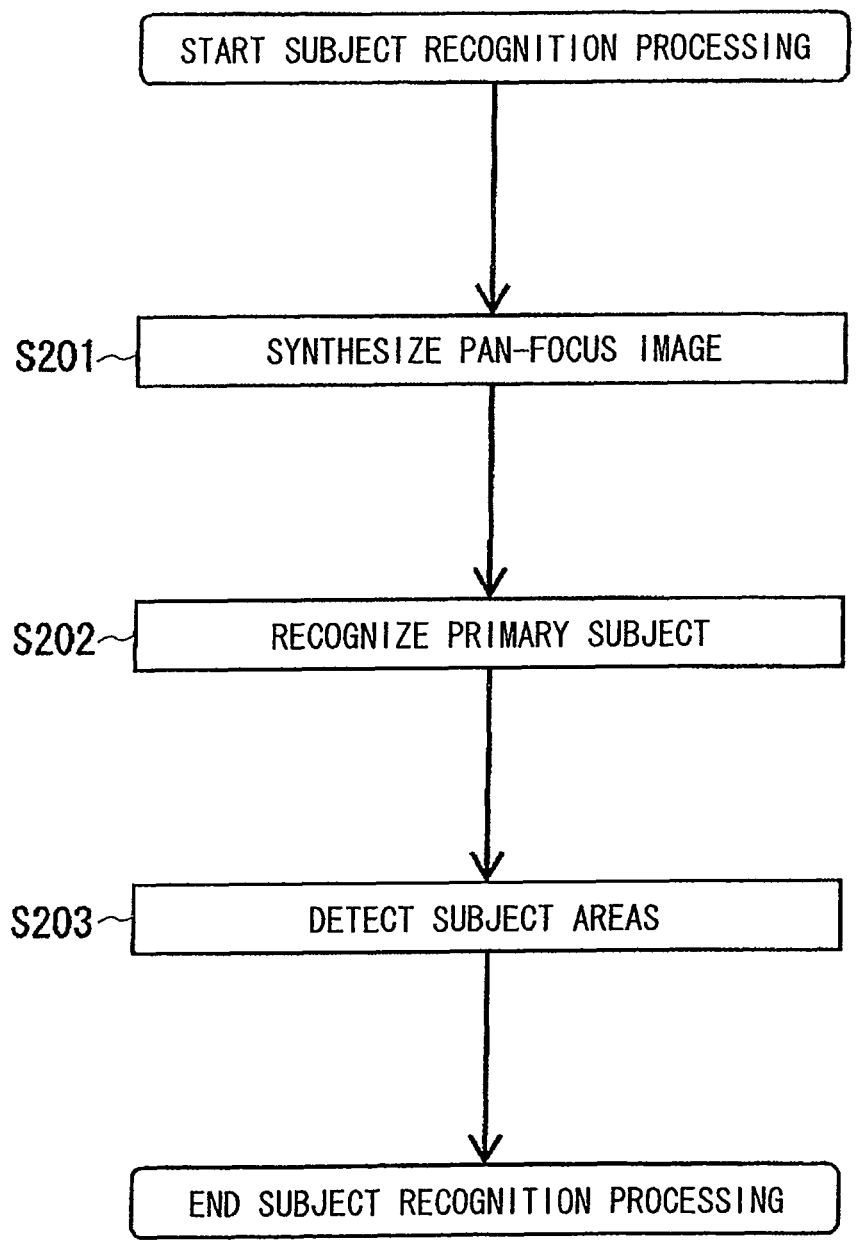
FIG. 6 is a flowchart used to illustrate the subject confirmation processing of step S110 of FIG. 5.

In step S110, subject recognition processing is performed by the camera control section 150. Here, FIG. 6 is a flowchart showing the subject recognition processing according to the present embodiment. In the following description, the subject recognition processing of step S110 is described with reference made to FIG. 6.

Firstly, in step S201, based on the photoreception signal obtained in step S107, a pan-focus image is created by the camera control section 150. For example, the positions of the photoelectric conversion elements 112a which correspond to the center of each micro lens 111a are determined from the position (i.e., image height) of the micro lens 111a which corresponds to the optical axis of the imaging optical system, and from the distance from the micro lens 111a to the pupil of the focusing lens 212. The photoreception signals of the photoelectric conversion elements 112a which correspond to the center of each micro lens 111a or to a point adjacent to these centers are then extracted. The photoreception signals extracted in this manner are signals obtained at an aperture size which corresponds to the photoelectric conversion elements 112a. By integrating the photoreception signals extracted from the photoelectric conversion elements 112a which correspond to the center of each micro lens 111a or to a position adjacent thereto, it is possible to create a pan-focus image.

In step S202, based on the pan-focus image created in step S201, the photograph scene is recognized by the camera control section 150 and, based on the recognized scene, the primary subject within the photograph image is recognized. For example, when the camera control section 150 detects the face of the person by means of template matching or the like, the scene is recognized as being one in which a person is being photographed, and the face portion of that person are recognized as the primary subject. Note that the method used to recognize the scene is not particularly limited and, in addition to the above described face detection, known methods such as pattern matching or color extraction or the like may also be used.

In step S203, areas in the photograph image that correspond to the recognized subject are detected by the camera control section 150 as subject areas. For example, when the camera control section 150 recognizes the face of a person as being the primary subject in step S202, it detects the areas in the photograph image which correspond to the face portion of this person as the subject areas. As a result of this, the subject recognition processing of step S110 is ended.

Returning to FIG. 5, in step S111, the photoreception signals obtained in step S107 from the sensor control section 141 are acquired by the defocus calculation section 142, and the signals to be used for focal point detection are read from among these acquired photoreception signals. Here, in order to perform the focal point detection for the primary subject among photograph image, the defocus calculation section 142 reads as the signals to be used for focal point detection those photoreception signals which correspond to the subject areas set in step S110 from among all of the areas in the photograph image. Next, based on the focal point detection signals which correspond to the subject areas, the amount of image displacement is calculated by the defocus calculation section 142 using a pupil sectional phase difference detection method. As a result, a defocus amount df is calculated.

In step S112, an image plane position which corresponds to the defocus amount df calculated in step S111, namely, an image plane position at the lens position of the focusing lens 212 after the focusing lens 212 has been driven in accordance with the defocusing amount df is determined by the camera control section 150. Next, a determination is made by the camera control section 150 as to whether or not the image plane position which corresponds to the defocus amount df is located within an image synthesis range (described below).

Figure 7:
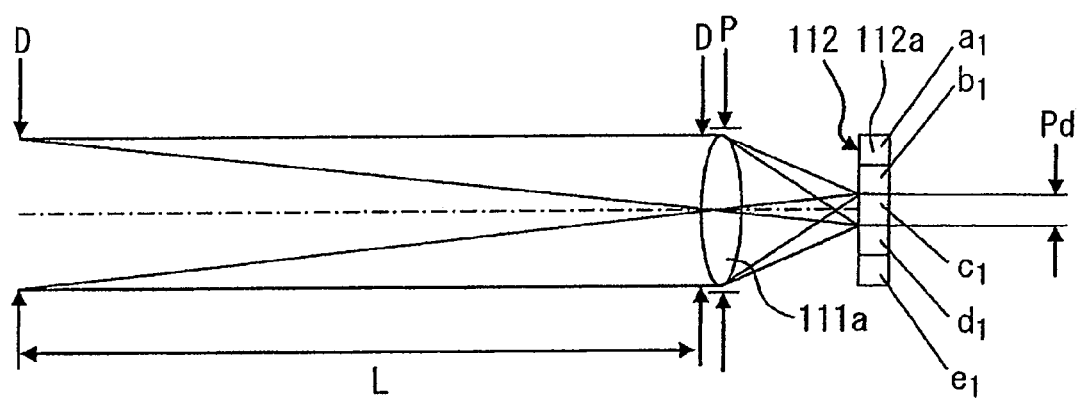
FIG. 7 is a view showing an example of luminous flux which is irradiated onto a specific photoelectric conversion element from among a plurality of photoelectric conversion elements that make up part of a photoelectric conversion element array through a micro lens.

Here, FIG. 7 is a view illustrating an image synthesis range which is the range of an image plane capable of being synthesized based on the photoreception signals, and is a view showing the luminous flux which is irradiated via the micro lenses 111a onto a specific photoelectric conversion element $c_1$ from among the plurality of photoelectric conversion elements 112a that make up the photoelectric conversion element array 112. Note that in FIG. 7, the respective photoelectric conversion elements 112a that make up the photoelectric conversion element array 112 are shown as $a_1$, $b_1$, $c_1$, $d_1$, and $e_1$. The image resolution which can be obtained by the imaging apparatus according to the present embodiment corresponds to a single micro lens portion and this also equates to a pixel unit. Because of this, as is shown in FIG. 7, the range of the image plane where an image can be synthesized with the resolution thereof being maintained can be set as a distance L from a micro lens 111a in which the size of a back projection image formed by the micro lens 111a of the photoelectric conversion element 112 is substantially the same as the effective diameter D of the micro lens $111a$. Namely, if light from a range having the same size as the effective diameter D (wherein the array pitch P>D) of the micro lens $111a$ passes through the micro lens $111a$, and strikes the single photoelectric conversion element $c_1$, then it is possible to obtain a resolution which corresponds to the size of a micro lens, which is also a pixel unit. Here, the smaller the spread of the luminous flux which passes through the micro lens $111a$ and is irradiated onto the single photoelectric conversion element $c_1$, the greater the distance L (i.e., the range where it is possible to obtain a resolution which corresponds to the size of a micro lens—which also forms a pixel unit) becomes. The spread of the luminous flux which is irradiated onto the photoelectric conversion element $c_1$ matches the spread of the luminous flux which passes through a predetermined area on the pupil of the focusing lens 212. Namely, the spread of the luminous flux which is irradiated onto the photoelectric conversion element $c_1$ is a value which conforms to the aperture F value of the focusing lens 212. Because of this, the distance L where it is possible to obtain a resolution which corresponds to the size of a micro lens, which also forms a pixel unit, is decided in accordance with the effective diameter D of the micro lenses $111a$, the aperture F value of the focusing lens 212, and the size Pd of the photoelectric conversion elements $112a$. In the present embodiment, this distance L is taken as the image synthesis range, and if the image plane position is within this image synthesis range, then it is possible to synthesize the photograph image.

Because of this, in step S112, the camera control section 150 determines whether or not an image plane position which corresponds to the defocus amount df is present within this image synthesis range, and if it is determined that an image plane position which corresponds to the defocus amount df is present within this image synthesis range, then based on the photoreception signal obtained at the current lens position of the focusing lens 212, the camera control section 150 determines that it is possible to synthesize a photograph image whose focal point matches an image plane which corresponds to the defocus amount df, and the routine moves to step S113. If, however, it is determined that an image plane position which corresponds to the defocus amount df is not present within this image synthesis range, then based on the photoreception signal obtained at the current lens position of the focusing lens 212, the camera control section 150 determines that it is not possible to synthesize a photograph image whose focal point matches an image plane which corresponds to the defocus amount df, and the routine moves to step S114.

Figure 8:
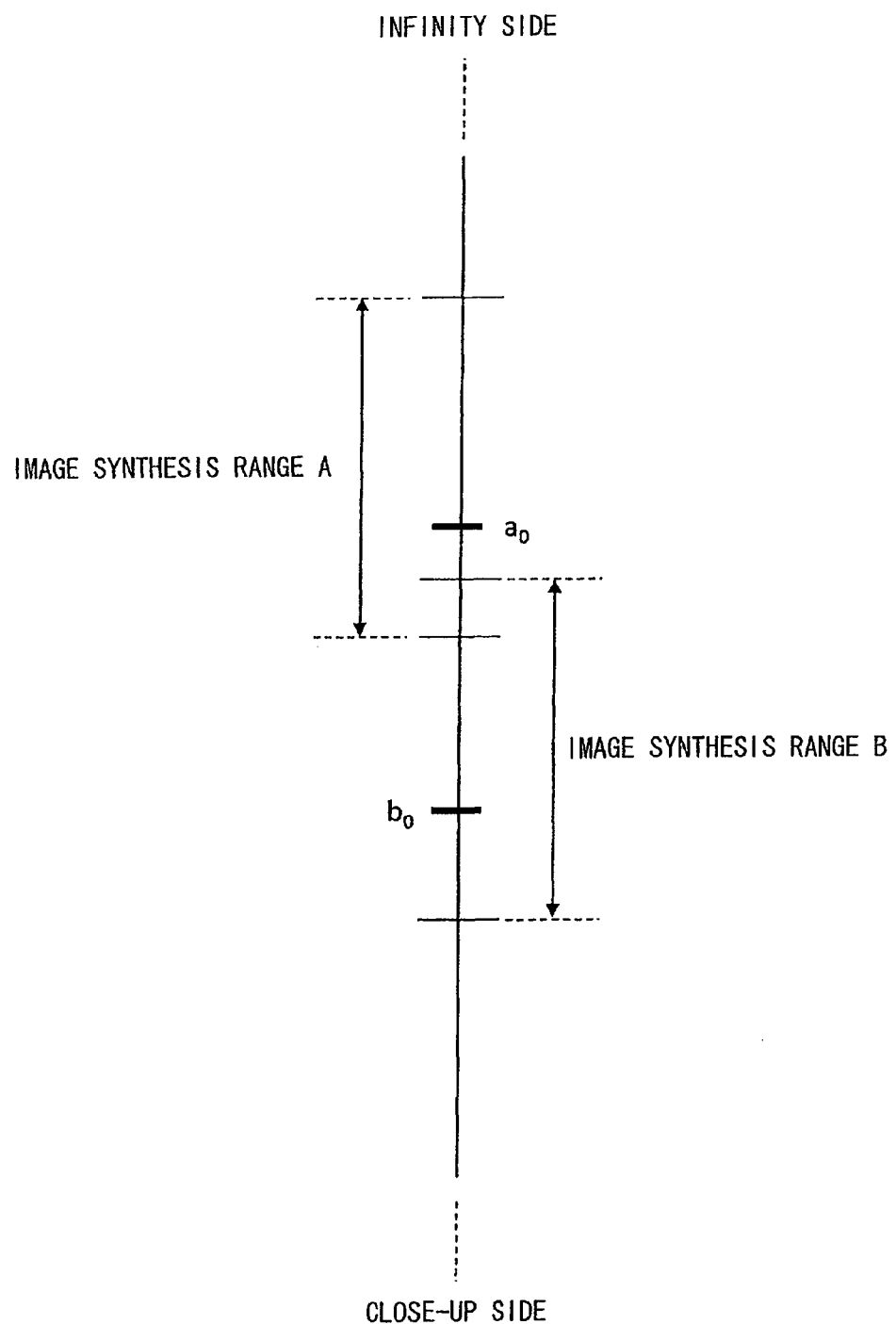
FIG. 8 is a view used to illustrate a relationship between the lens position of a focusing lens and an image synthesis range.

Here, FIG. 8 is a view illustrating a relationship between the lens position of the focusing lens 212 and the image synthesis range, and shows an image plane position which corresponds to the current lens position of the focusing lens 212 as an image plane position $a_0$, and shows an image plane position which corresponds to the defocus amount df (i.e., an image plane position which is focused on the primary subject) as an image plane position $b_0$. In the example shown in FIG. 8, when the focusing lens 212 is in a lens position which corresponds to the image plane position $a_0$, then the range of the image plane where synthesis is possible is the image synthesis range A. Namely, when the focusing lens 212 is in a lens position which corresponds to the image plane position $a_0$, if the image plane position is within the image synthesis range A, then it is possible to synthesize a photograph image in accordance with the image synthesizing method described below. Because of this, when an image plane position which corresponds to the defocus amount df (i.e., an image plane position which is focused on the primary subject) is present within the image synthesis range A, then it is determined that it is possible to synthesize an image whose focal point matches the primary subject and the routine moves to step S113. If, on the other hand, the focusing lens 212 is in a lens position which corresponds to the image plane position $a_0$, then if the image plane position which corresponds to the defocus amount df (i.e., an image plane position which is focused on the primary subject) is not present within the image synthesis range A (for example, if the image plane position which corresponds to the defocus amount df is present at the image plane position $b_0$ in FIG. 8), then it is determined that it is not possible to synthesize an image whose focal point matches the primary subject and the routine moves to step S114.

Figure 9:
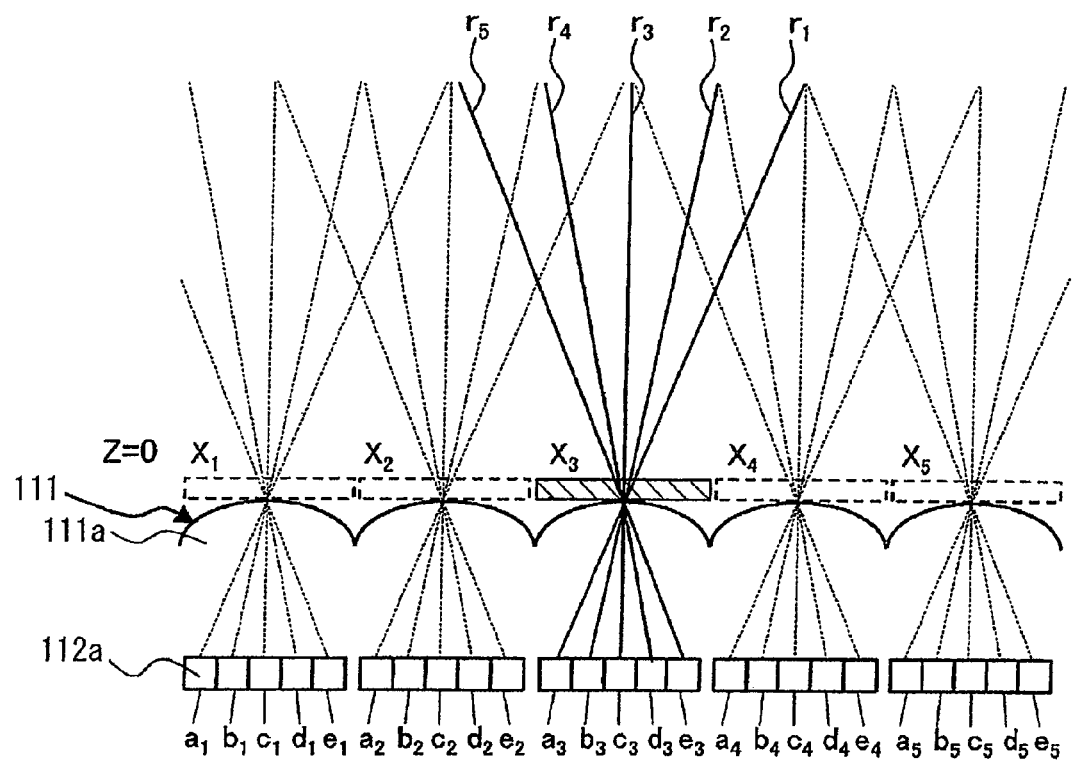
FIG. 9 is a view used to illustrate an example of an image synthesizing method when an image plane which corresponds to the being position of a subject is a specific surface (i.e., Z=0).
Figure 10:
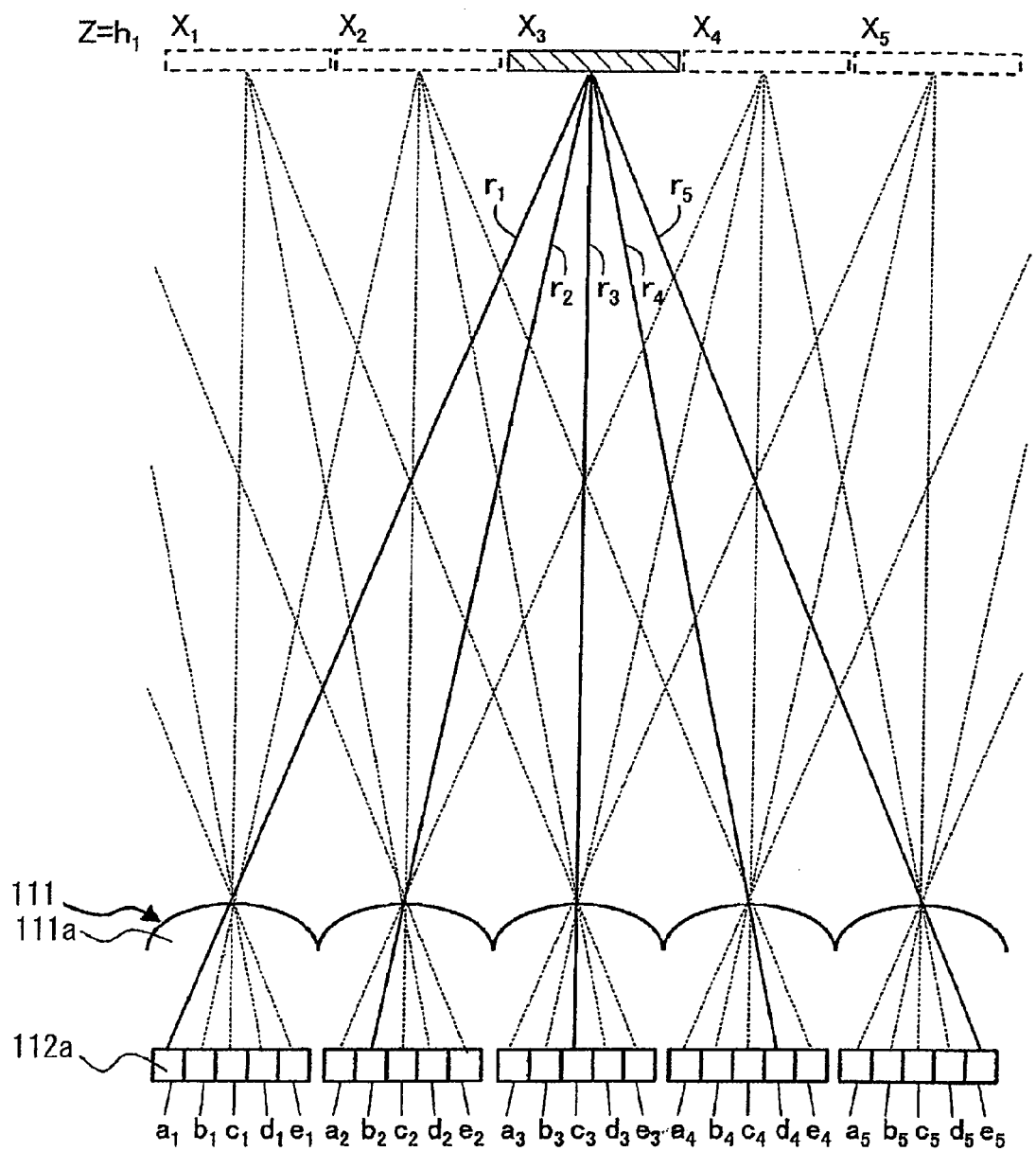
FIG. 10 is a view used to illustrate an example of an image synthesizing method when an image plane which corresponds to the being position of a subject is a specific surface (i.e., $Z=h_1$).
Figure 11:
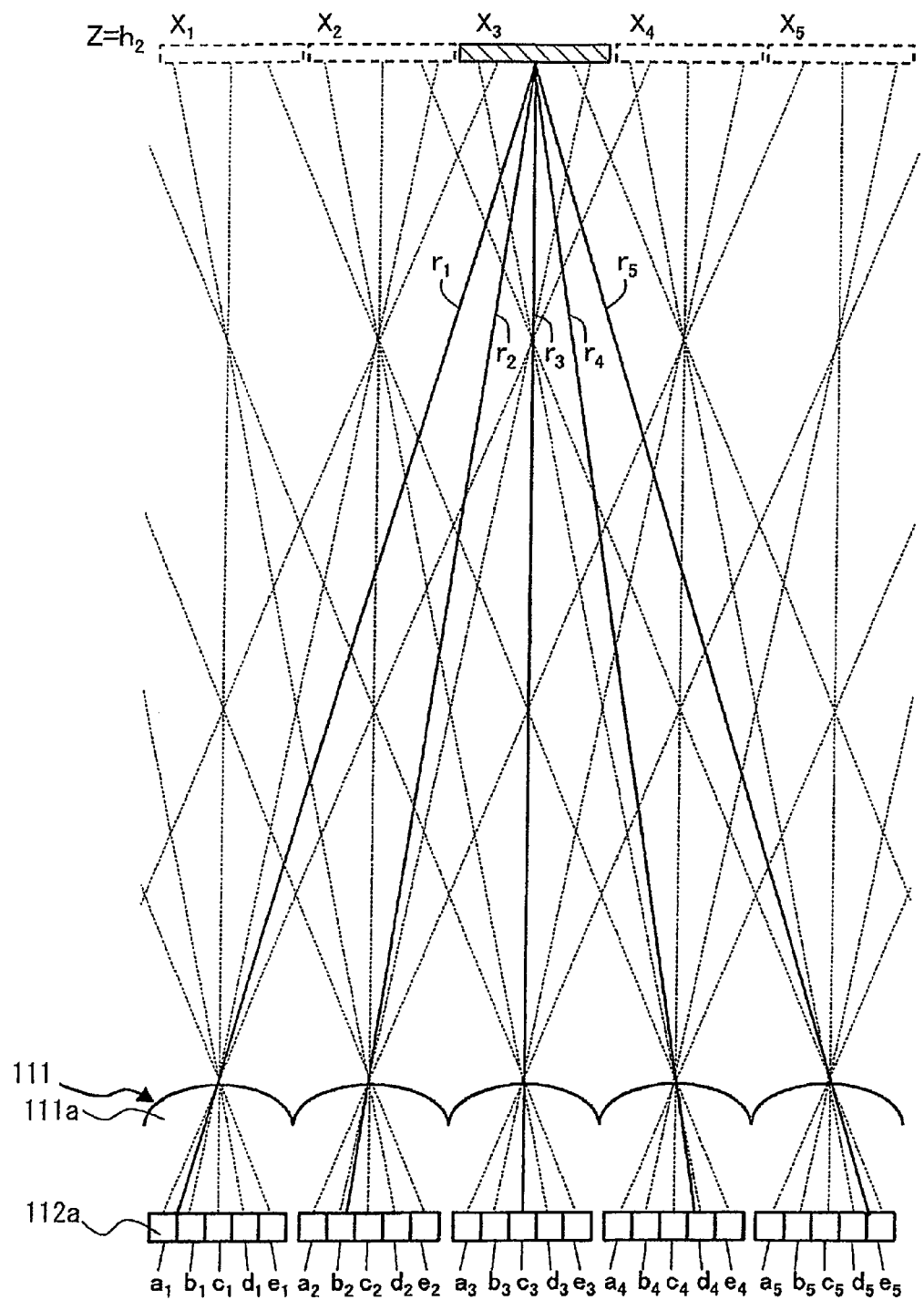
FIG. 11 is a view used to illustrate an example of an image synthesizing method when an image plane which corresponds to the being position of a subject is a specific surface (i.e., $Z=h_2$).

In step S113, based on the photoreception signal obtained in step S107, an image signal which conforms to the image plane position which corresponds to the defocus amount df is synthesized as the photograph image by the camera control section 150 without the focusing lens 212 being driven. Hereinafter, the method used to synthesize an image whose focal point matches an image plane which corresponds to the defocus amount df will be described with reference made to FIG. 9 through FIG. 11. FIG. 9 through FIG. 11 are views illustrating an example of the image synthesizing method of the present embodiment.

In the case example shown in FIG. 9, if the height of the image plane from the micro lens array 111 (i.e., the distance from the micro lens array 111) is taken as Z, then in this case the subject targeted for image synthesis is present at the position where the height Z of the image plane=0. In FIG. 9, for each photoelectric conversion element array 112 of the imaging element 110, the respective light rays that are irradiated onto five photoelectric conversion elements $112a$ (i.e., only the primary light rays that pass through the center of the micro lenses $111a$ that make up the micro lens array 111) from among the photoelectric conversion elements $112a$ that make up the respective photoelectric conversion element arrays 112 are shown. In FIG. 9, in order to identify each photoelectric conversion element $112a$, the individual photoelectric conversion elements $112a$ are shown as $a_1$ to $e_1$, $a_2$ to $e_2$, $a_3$ to $e_3$, $a_4$ to $e_4$, and $a_5$ to $e_5$. In addition, of the respective coordinates (i.e., optional coordinates in the array direction of the micro lenses $111a$) $X_1$, $X_2$, $X_3$, $X_4$, and $X_5$ where the height Z of the image plane=0, the emission luminous flux from $X_3$ (i.e., the light rays $r_1$, $r_2$, $r_3$, $r_4$, and $r_5$) is shown by solid lines, while the emission luminous flux from the remaining $X_1$, $X_2$, $X_4$, and $X_5$ is shown by dotted lines (this also applies in FIG. 10 and FIG. 11). As is shown in FIG. 9, each emission luminous flux (i.e., the light rays $r_1$, $r_2$, $r_3$, $r_4$, and $r_5$) from the coordinate $X_3$ where the height Z of the image plane=0 is irradiated respectively onto the photoelectric conversion elements $a_3$, $b_3$, $c_3$, $d_3$, and $e_3$. As a consequence, the pixel value L at the coordinate $X_3$ where the height Z of the image plane=0 (Z=0, $X_3$) can be determined (see Formula (1) below) by synthesizing the outputs from these photoelectric conversion elements $a_3$, $b_3$, $c_3$, $d_3$, and $e_3$.

$$L(Z=0, X_3) = \mathrm{Out}(a_3) + \mathrm{Out}(b_3) + \mathrm{Out}(c_3) + \mathrm{Out}(d_3) + \mathrm{Out}(e_3) \quad (1)$$

Moreover, in the same way, the pixel value L (Z=0, $X_4$) at the coordinate $X_4$ which is adjacent to the coordinate $X_3$ can be determined in accordance with the following Formula (2).

$$L(Z=0, X_4) = \mathrm{Out}(a_4) + \mathrm{Out}(b_4) + \mathrm{Out}(c_4) + \mathrm{Out}(d_4) + \mathrm{Out}(e_4) \quad (2)$$

Accordingly, the pixel values L $(Z=0, X_i)$ at the coordinates $X_i$ can each be determined in accordance with the following Formula (3).

$$L(Z=0,X_i)=\text{Out}(a_i)+\text{Out}(b_i)+\text{Out}(c_i)+\text{Out}(d_i)+\text{Out}(e_i) \quad (3)$$

Note that the above Formula (3) is used when the aperture value specified by the photographer is open (i.e., at the maximum aperture size). As a consequence, even if the aperture value specified by the photographer is at maximum (i.e., at the minimum aperture size), because it is sufficient to limit the luminous flux formed by the light rays $r_1, r_2, r_3, r_4$, and $r_5$ to only the luminous flux formed by the light ray $r_3$, it is sufficient to employ the following Formula (4) instead of the above Formula (3) (this also applies in the cases shown in FIG. 10 and FIG. 11 below).

$$L(Z=0,X_i)=\text{Out}(c_i) \quad (4)$$

Moreover, when the aperture value specified by the photographer is an intermediate value (i.e., at an intermediate aperture size), because it is sufficient to limit the luminous flux formed by the light rays $r_1, r_2, r_3, r_4$, and $r_5$ to only the luminous flux formed by the light rays $r_2, r_3$, and $r_4$, it is sufficient to employ the following Formula (5) instead of the above Formula (3) (this also applies in the cases shown in FIG. 10 and FIG. 11 below).

$$L(Z=0,X_i)=\text{Out}(b_i)+\text{Out}(c_i)+\text{Out}(d_1) \quad (5)$$

Note that in the above description, only the five photoelectric conversion elements $a_3, b_3, c_3, d_3$, and $e_3$ aligned in a single particular direction were observed, and the sum of the output values of these five photoelectric conversion elements was obtained, however, in actual fact, it is necessary to obtain the sum of the output values of 25 photoelectric conversion elements aligned in two directions (this also applies in the cases shown in FIG. 10 and FIG. 11 below).

Next, as is shown in FIG. 10, a description is given of a case in which a subject targeted for image synthesis is present at a position where the height Z of the image plane=$h_1$. As is shown in FIG. 10, unlike the case shown in FIG. 9, each emission luminous flux (i.e., the light rays $r_1, r_2, r_3, r_4$, and $r_5$) from the coordinate $X_3$ where the height Z of the image plane=$h_1$ is irradiated respectively onto the photoelectric conversion elements $a_1, b_2, c_3, d_4$, and $e_5$. As a consequence, the pixel value L at the coordinate $X_3$ where the height Z of the image plane=$h_1$ ($Z=h_1$, $X_3$) can be determined (see Formula (6) below) by synthesizing the outputs from these photoelectric conversion elements $a_1, b_2, c_3, d_4$, and $e_5$.

$$L(Z=h_1,X_3)=\text{Out}(a_1)+\text{Out}(b_2)+\text{Out}(c_3)+\text{Out}(d_4)+\text{Out}(e_5) \quad (6)$$

Furthermore, as is shown in FIG. 11, a description is given of a case in which a subject targeted for image synthesis is present at a position where the height Z of the image plane=$h_2$. As is shown in FIG. 11, unlike the cases shown in FIG. 9 and FIG. 10, each emission luminous flux (i.e., the light rays $r_1, r_2, r_3, r_4$, and $r_5$) from the coordinate $X_3$ where the height Z of the image plane=$h_2$ is irradiated across a plurality of photoelectric conversion elements. Specifically, as is shown in FIG. 11, the light ray $r_1$ is irradiated across the photoelectric conversion elements $a_1$ and $b_1$, the light ray $r_2$ is irradiated across the photoelectric conversion elements $b_2$ and $c_2$, the light ray $r_4$ is irradiated across the photoelectric conversion elements $c_4$ and $d_4$, and the light ray $r_5$ is irradiated across the photoelectric conversion elements $d_5$ and $e_5$. Note that the ray $r_3$ is irradiated onto only the photoelectric conversion element $c_3$ as shown in FIG. 11. As a consequence, looking at the light ray $r_1$, the amount of light of the light ray $r_1$ can be determined using the weighting sum of the output value Out ($a_1$) of the photoelectric conversion element $a_1$ and the output value Out ($b_1$) of the photoelectric conversion element $b_1$ (see Formula (7) below). Here, in Formula (7), $w_{11}$ and $w_{12}$ are weighting coefficients, and are coefficients which are determined in accordance with the height Z of the image plane from the micro lens array 111.

$$\text{Out}(a_1) \times w_{11} + \text{Out}(b_1) \times w_{12} \quad (7)$$

Because the amounts of light of the light ray $r_2$, the light ray $r_4$, and the light ray $r_5$ can also be determined in the same way using a weighting sum, the pixel value L ($Z=h_2$, $X_3$) at the coordinate $X_3$ where the height Z of the image plane=$h_2$ can be determined in accordance with the following Formula (8). Note that in Formula (8), $w_{21}, w_{22}, w_{41}, w_{42}, w_{51}$, and $w_{52}$ are weighting coefficients, and are coefficients which are determined in accordance with the height Z of the image plane from the micro lens array 111.

$$L(Z=h_2,X_3)=[\text{Out}(a_1) \times w_{11} + \text{Out}(b_1) \times w_{12}] + [\text{Out}(b_2) \times w_{21} + \text{Out}(c_2) \times w_{22}]] + \text{Out}(c_3) + [\text{Out}(c_4) \times w_{41} + \text{Out}(d_4) \times w_{42}] + [\text{Out}(d_5) \times w_{51} + \text{Out}(e_5) \times w_{52}] \quad (8)$$

In this manner, the values of the photoelectric conversion elements 112a onto which luminous flux from a subject is irradiated, and of the weighting coefficients which are required for image synthesis are decided in accordance with the image plane positions Z where a subject targeted for image synthesis is present. Note that a structure may also be employed in which the values of the photoelectric conversion elements 112a onto which luminous flux from a subject is irradiated which correspond to each image plane position Z, and of the weighting coefficients which are required for image synthesis which also correspond to each image plane position Z may, for example, be stored in advance in memory provided in the camera control section 150, and this memory may be employed as is required.

As has been described above, based on photoreception signals obtained from a plurality of photoelectric conversion elements 112a, the camera control section 150 is able to synthesize a photograph image whose focal point matches an image plane (the image plane position Z) which corresponds to the defocus amount df. Therefore, in step S113, in accordance with the above described image synthesizing method, the camera control section 150 synthesizes a photograph image whose focal point matches an image plane (the image plane position Z) which corresponds to the defocus amount df.

If, however, it is determined in step S112 that an image plane position which corresponds to the defocus amount df is not present within the image synthesis range, the routine moves to step S114. In step S114, the defocus amount df which has been transmitted from the defocus calculation section 142 is acquired by the lens drive amount calculation section 143 and, based on the acquired defocus amount df, a lens drive amount ΔW (this equates to a lens target position) for the focusing lens 212 is calculated. The lens drive amount ΔW is then output from the lens drive amount calculation section 143 to the camera control section 150.

In step S115, the lens drive amount ΔW decided by the lens drive amount calculation section 143 is transmitted to the lens control section 250 via the camera control section 150. The lens control section 250 then drives the lens drive motor 230 in accordance with the lens drive amount ΔW which results in the focusing lens 212 being driven.

In step S116, photographing an image by the imaging element 110 is performed based on control performed by the sensor control section 141 at the lens position of the focusing lens 212 after it has been driven. The photoreception signal obtained at the lens position of the focusing lens 212 after it has been driven is transmitted to the camera control section 150. In the next step S117, in the same way as in step S102, lens information such as the lens position of the focusing lens 212 after it has been driven is acquired, and then, in step S118, in the same way as in step S103, photograph information such as the aperture value and the like is obtained.

Next, in step S119, based on the photoreception signal obtained at the lens position of the focusing lens 212 after it has been driven, in accordance with the same type of image synthesizing method as that employed in step S113, an image of the image plane position which corresponds to the defocus amount df calculated in step S111, namely, of the image plane position which focuses on the primary subject is synthesized as the photograph image.

For example, in the example shown in FIG. 8, when the focusing lens 212 is in a lens position which corresponds to the image plane position $a_o$, and when the image plane position which focuses on the primary subject (i.e., an image plane position which corresponds to the defocus amount df) is not present within the image synthesis range A (i.e., when the result of the determination in step S112 is NO), for example, when an image plane position which focuses on the primary subject (i.e., an image plane position which corresponds to the defocus amount df) is present at the image plane position $b_0$, an operation such as that described below takes place. Namely, firstly, the focusing lens 212 is driven to a lens position which corresponds to the image plane position $b_0$ which focuses on the primary subject (i.e., the image plane position $b_0$ which corresponds to the defocus amount df) (step S115), and at the lens position after this driving, the image is photographed (step S116), and based on the photoreception signal obtained as a result of this, a photograph image whose focal point matches the image plane position which focuses on the primary subject (i.e., the image plane position $b_0$) is synthesized (step S119). In this manner, in the present embodiment, when it is determined that an image plane position which focuses on the primary subject is not present within the image synthesizing range A (i.e., when the determination in step S112 is NO), the focusing lens 212 is driven to a lens position which corresponds to the image plane position $b_0$, and by photographing the image at the lens position after this driving, the image synthesizing range which is based on the photoreception signal obtained as a result of this photography can be set as an image synthesizing range B shown in FIG. 8. By doing this, it becomes possible to synthesize an image which corresponds to an optional image plane position in the image synthesizing range B which includes the image plane position $b_0$.

In step S120, the created image which was synthesized in step S119, is displayed on the display unit of the liquid crystal monitor 120, and is also stored in the memory 160. As a consequence, the photographer is able to obtain a photograph image whose focal point matches the primary subject.

Next, in step S121, a determination is made by the camera control section 150 as to whether or not to end the moving image photography. For example, if the shutter release button of the operation section 130 is pressed by the photographer during the moving image photography, a determination to end the moving image photography is made and this processing is ended. If, however, the shutter release button of the operation section 130 is not pressed during the moving image photography, a determination to continue the moving image photography is made and the routine moves to step S106 where the photographing of images and the synthesizing of these photograph images are performed repeatedly.

In this manner, in the present embodiment, for example, while moving images are being photographed in moving image photography mode, a determination is made as to whether or not an image plane position which is focused on a subject is present within the image synthesis range, and if an image plane position which is focused on a subject is present within the image synthesis range (i.e., if the determination in step S112 is YES), then the synthesizing of a photograph image is performed at the image plane position which focuses on the subject (step S113) without the focusing lens 212 being driven.

If, however, an image plane position which is focused on a subject is not present within the image synthesis range (i.e., if the determination in step S112 is NO), then the focusing lens 212 is driven in accordance with the defocus amount df (step S114 through step S115) and, based on the photoreception signal obtained at the focusing lens position after this driving, the synthesizing of a photograph image at an image plane position which focuses on the subject is performed (step S116 through step S119). These processings are performed repeatedly during the moving image photography. As a consequence of this, in the present embodiment, even if an image plane position which focuses on a subject is present within an image synthesis range, or if the photography distance to a subject changes and the image plane position which focuses on the subject moves out of the image synthesizing range, because it is possible to synthesize captured images whose focal points match an image plane which corresponds to the subject, it is possible to consecutively obtain photograph images whose focal points match the subject.

As has been described above, in the present embodiment, when an image plane position which focuses on a subject is present within an image synthesizing range, by synthesizing captured images which correspond to an image plane position which focuses on the subject without driving the focusing lens 212, it is possible to obtain an image whose focal point matches the subject. Moreover, when an image plane position which focuses on a subject is not present within an image synthesizing range, by driving the focusing lens 212 and synthesizing photograph images of image plane positions which focus on the subject based on photoreception signals obtained at the focusing lens position after this driving, it is possible to obtain an image whose focal point matches the subject. In this manner, in the present embodiment, while making it possible for images whose focal points match the subject to be properly obtained, by only driving the focusing lens 212 when an image plane position which is focused on a subject is not present within the image synthesizing range, it is possible to reduce the frequency with which the focusing lens 212 is driven and, consequently, to reduce the amount of power consumed by the driving of the focusing lens 212 and also reduce the generation of lens driving noise.

Note that the above described embodiment is intended to simplify understanding of the present invention, and in no way limits the present invention. Accordingly, the scope of each component element disclosed in the above described embodiment includes all design modifications and equivalent elements that pertain to the range of technology of the present invention.

For example, in step S115 of the present embodiment, the focusing lens 212 is driven by the lens drive amount AW which corresponds to the defocus amount df, however, the position where the focusing lens 212 is driven is not limited to a lens position that corresponds to the defocus amount df and, for example, as is described below, it is also possible to employ a structure in which the focusing lens 212 is driven to a lens position including the image synthesis range where exists an image plane position which focuses on a primary subject and also exist a number of image plane positions that focus on subjects other than the primary subject.

Figure 12:
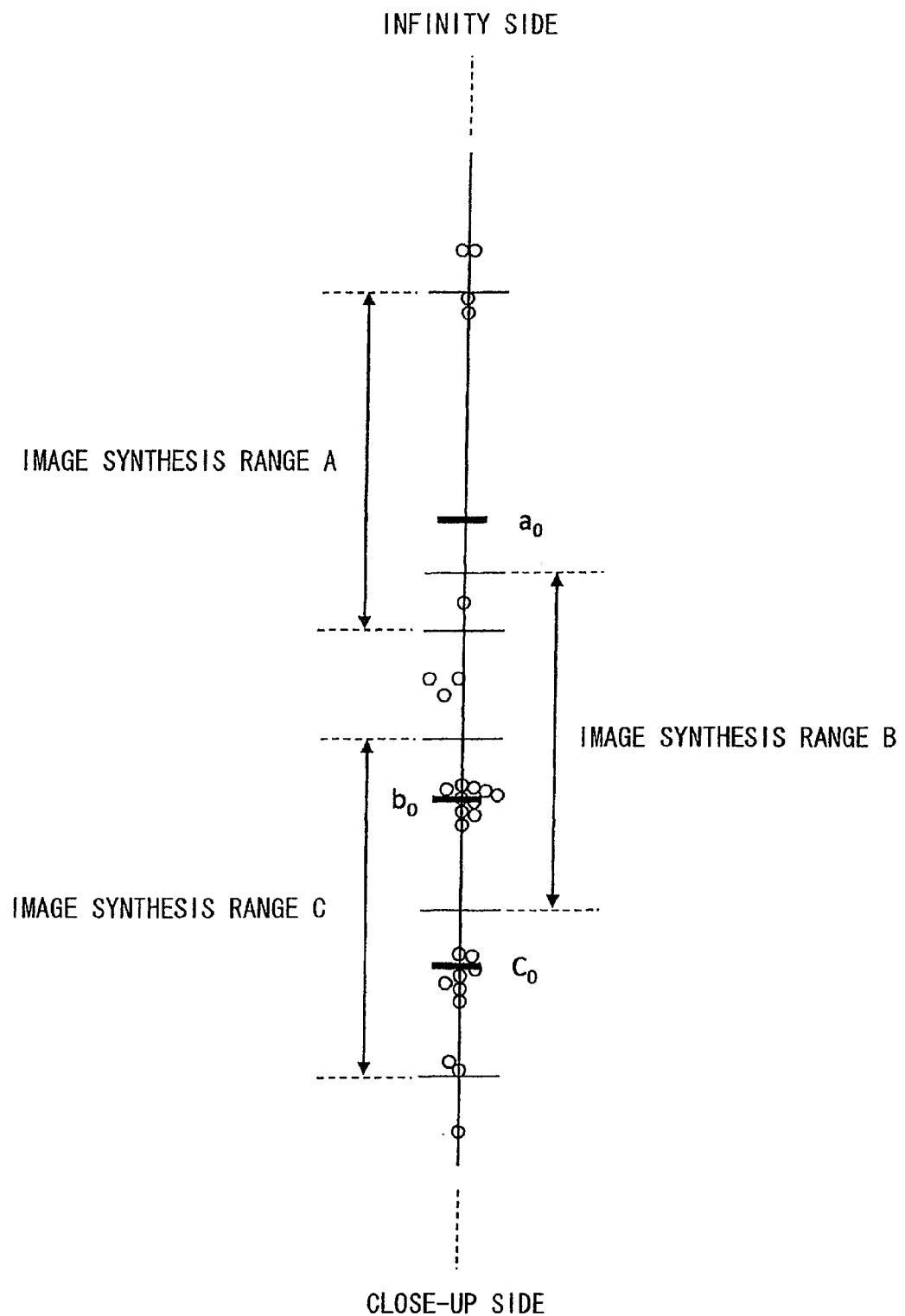
FIG. 12 is a view used to illustrate a method of deciding the lens position of a focusing lens in another embodiment.

FIG. 12 is a view illustrating a method for deciding the lens position of the focusing lens 212 according to another embodiment. Note that in FIG. 12, in the same way as in FIG. 8, an image plane position which corresponds to the current lens position of the focusing lens 212 is shown as the image plane position $a_o$, while an image plane position which focuses on the primary subject is shown as the image plane position $b_o$. For example, in the example shown in FIG. 12, the defocus amount df is calculated for a plurality of areas other than the subject area on a photograph screen, and the distribution of the defocus amount df in each area of the photograph image is determined. Here, in FIG. 12, image plane positions that correspond to the defocus amounts df calculated in each area of the captured image are shown as hollow circles. Namely, the hollow circles shown in FIG. 12 show the distribution of the defocus amounts df calculated in each area of a photograph image. In the example shown in FIG. 12, based on this distribution of the defocus amount df, the lens position which corresponds to the image plane position $c_o$ in FIG. 12 is determined as the lens position including the image synthesis range where exists the image plane position $b_o$ which focuses on the primary subject and also exist the largest number of image plane positions that focus on subjects other than the primary subject. The focusing lens 212 is then driven to a lens position which corresponds to this image plane position $c_o$. As is shown in FIG. 12, by taking the focusing lens position as a lens position that corresponds to the image plane position $c_o$ which is decided based on the distribution of the defocus amounts df of each area in a photograph image, it is possible to obtain an image synthesis range (i.e., the image synthesis range C in FIG. 12) in which, in addition to the image plane position $b_0$ which focuses on the primary subject, a large number of image plane positions which focus on subjects other than the primary subject are also present. Accordingly, by driving the focusing lens 212 to a lens position which corresponds to the image plane position $c_0$ which is based on the distribution of the defocus amounts df of each area in a photograph image, in addition to obtaining a photograph image in which the focal points match for the primary subject, it is also possible to obtain a photograph image in which the focal points match for a plurality of subjects other than the primary subject.

Moreover, in step S115 of the present embodiment, the focusing lens 212 is driven by a lens drive amount ΔW which corresponds to the defocus amount df, however, it is also possible to employ a structure in which the focusing lens 212 is driven to an optional lens position where the image plane positions that correspond to the defocus amounts df are within the image synthesis range. For example, it is possible to employ a structure in which, in a focusing lens 212 whose lens drive speed is comparatively fast, the focusing lens 212 is driven to a lens position which corresponds to the defocus amount df, while in a focusing lens 212 whose lens drive speed is comparatively slow, the image plane position which corresponds to the defocus amount df is present within an image synthesis range and also the focusing lens 212 is driven from the current lens position of the focusing lens 212 to a lens position where the lens drive amount ΔW is the smallest.

In addition, in the present embodiment, a structure is employed in which the synthesizing of a captured image is performed during moving image photography, however, the present invention is not limited to this and it is also possible to employ a structure in which, for example, only the acquisition of photoreception signals and the storage of acquired photoreception signals are performed during moving image photography, and when captured images are played back after moving image photography, based on the stored photoreception signals, the defocus amount df is calculated and a captured image at an image plane position which corresponds to the defocus amount df is synthesized and is then played back as a moving image.

Moreover, in the present embodiment, the synthesizing of photograph images is performed in the camera 1, however, the synthesizing of photograph images is not limited to being performed in a camera and it is also possible to employ a structure in which photoreception signals are acquired in the camera 1 and the acquired photoreception signals are then output (for example, output via an output section provided in the camera 1), and in devices other than the camera 1, for example, an image playing apparatus (an image playback device) which is used to play back images, the photoreception signals output by the camera 1 are acquired and, based on these acquired photoreception signals, the defocus amount df is calculated and the synthesizing of playback images at an image plane position which corresponds to the defocus amount df is performed. For example, the image playing apparatus may have an input device, a detection device, and a control device. Photoreception signals output by the camera 1 are input into the image playing apparatus by the input device, image plane positions are detected by the detection device, and images of the image plane positions are created by the control device. Furthermore, it is also possible to employ a structure in which, in the camera 1, a plurality of photoreception signals which have been imaged at a predetermined frame rate are output, while when a plurality of photoreception signals imaged at a predetermined frame rate are acquired in devices other than the camera 1, if it is determined that an image plane position which corresponds to the defocus amount df is not present in an image synthesizing range which is based on the photoreception signal that corresponds to a particular frame, a determination is made as to whether or not an image plane position which corresponds to the defocus amount df is present in an image synthesizing range which is based on the photoreception signal that corresponds to the next frame, and if it is determined that an image plane position which corresponds to the defocus amount df is present in an image synthesizing range, synthesizing of the photograph image is performed.

Note that the camera 1 of the present embodiment is not particularly limited and the present invention may be applied to other optical instruments such as, for example, to digital video cameras, single lens reflex digital cameras, compact digital cameras, and cameras in cell phones and the like.

The imaging apparatus according to an embodiment of the present invention comprises: a light receiving device having a micro lens array in which a plurality of micro lenses are arrayed two-dimensionally and having a plurality of photoelectric conversion elements that are provided for the plurality of micro lenses, and that outputs a plurality of photoreception signals that are obtained by receiving optical flux from an optical system via the micro lenses; a detection device that, based on the photoreception signals, detects an amount of displacement between an image plane obtained from the optical system and a light receiving plane obtained from the light receiving device; a focal point adjustment device that performs focal point adjustment on the optical system based on the displacement amount; and a control device that, when an image plane that corresponds to the displacement amount is contained within an image planes range within which it is possible to create an image that is based on the photoreception signal, creates an image of the image plane that corresponds to the displacement amount based on a photoreception signal which is selected in accordance with the displacement amount from among the plurality of photoreception signals, and then displays this image.

In the above described embodiment it is possible to employ a structure in which, when the image plane which corresponds to the displacement amount is not contained within the range of image planes where the image can be created, the focal point adjustment device performs the focal point adjustment on the optical system in accordance with the displacement amount.

In the above described embodiment it is possible to employ a structure in which there is further provided a recognition device that recognizes a specific subject (object, target) image from among the images from the optical system, and the detection device detects the displacement amount for the image recognized by the recognition device.

In the above described embodiment it is possible to employ a structure in which the range of image planes where an image can be created is determined based on an effective diameter of the micro lens, an aperture F value of the micro lens, and the size of the photoelectric conversion element.

In the above described embodiment it is possible to employ a structure in which there is further provided an imaging device that acquires moving images based on the photoreception signals.

The image playing apparatus according to another embodiment of the present invention is provided with: an input device that inputs a plurality of photoreception signals that are obtained by receiving optical flux from an optical system which is in a specific focal point state; a detection device that, based on the photoreception signals, detects an image plane position from the optical system which is in a specific focal point state; and a control device that, when the image plane position is contained within an image plane range within which it is possible to create an image that is based on the photoreception signal, creates an image of the image plane position based on a photoreception signal which is selected in accordance with the image plane position from among the plurality of photoreception signals, and then displays this image.

In the above described embodiment it is possible to employ a structure in which, when the image plane position is not contained within the range of an image plane within which it is possible to create the image, the input device inputs a photoreception signal obtained by receiving optical flux from the optical system which is in a different focal point state from the specific focal point state.

What is claimed is:

1. An imaging apparatus comprising:
    a light receiving device having a micro lens array in which a plurality of micro lenses are arrayed two-dimensionally, and a plurality of photoelectric conversion elements that are provided for the plurality of micro lenses, and that outputs a plurality of photoreception signals that are obtained by receiving optical flux from an optical system via the micro lenses;
    a detection device that, based on the photoreception signals, detects an amount of displacement between an image plane obtained from the optical system and a light receiving plane obtained from the light receiving device;
    a focal point adjustment device that performs focal point adjustment on the optical system based on the displacement amount; and
    a control device that (1) determines whether an image plane that corresponds to the displacement amount is contained within an image plane range within which it is possible to create a synthesized image based on the photoreception signal, and (2) when the image plane that corresponds to the displacement amount is contained within the image plane range within which it is possible to create the synthesized image that is based on the photoreception signal, creates of the image plane that corresponds to the displacement amount based on a photoreception signal which is selected in accordance with the displacement amount from among the plurality of photoreception signals.

2. The imaging apparatus according to claim 1, wherein, when the image plane which corresponds to the displacement amount is not contained within the range of image planes within which the image can be created, the focal point adjustment device performs the focal point adjustment on the optical system in accordance with the displacement amount.

3. The imaging apparatus according to claim 1, wherein there is further provided a recognition device that recognizes a specific subject image from among the images from the optical system, and
the detection device detects the displacement amount for the image recognized by the recognition device.

4. The imaging apparatus according to claim 1, wherein the range of image planes within which an image can be created is determined based on an effective diameter of the micro lens, an aperture F value of the micro lens, and the size of the photoelectric conversion element.

5. The imaging apparatus according to claim 1, wherein there is further provided an imaging device that acquires moving images based on the photoreception signals.

6. The imaging apparatus according to claim 1, wherein there is further provided a display section on which the created images are displayed, and
the control device displays the created images on the display section.

7. The imaging apparatus according to claim 1, wherein there is further provided a storage section in which the created images are stored, and
the control device stores the created images in the storage section.

8. The imaging apparatus according to claim 7, wherein the storage section is able to be removed.

9. The imaging apparatus according to claim 1, wherein there is further provided an output section from which the created images are output, and
the control device outputs the created images from the output section.

10. The imaging apparatus according to claim 1, wherein there is further provided an operation section that controls at least a portion of the operations of the control device.

11. An image playing apparatus comprising:
an input device that inputs a plurality of photoreception signals that are obtained by receiving optical flux from an optical system which is in a specific focal point state;
a detection device that, based on the photoreception signals, detects an image plane position from the optical system which is in a specific focal point state, wherein the detection device further detects an amount of displacement between the image plane position obtained from the optical system and a light receiving plane obtained from a light receiving device that generates the photoreception signals; and
a control device that (1) determines whether an image plane that corresponds to the displacement amount is contained within an image plane range within which it is possible to create a synthesized image based on the photoreception signal, and (2) when the image plane position is contained within the image plane range within which it is possible to create the synthesized image that is based on the photoreception signal, creates the image of the image plane position based on a photoreception signal which is selected in accordance with the image plane position from among the plurality of photoreception signals, and then displays this image.

12. The image playing apparatus according to claim 11, wherein, when the image plane position is not contained within the range of an image plane within which it is possible to create the image, the input device inputs a photoreception signal obtained by receiving optical flux from the optical system which is in a different focal point state from the specific focal point state.

* * * * *